(12) United States Patent
Bruckman

(10) Patent No.: US 7,035,279 B2
(45) Date of Patent: Apr. 25, 2006

(54) FLOW ALLOCATION IN A RING TOPOLOGY

(75) Inventor: Leon Bruckman, Petach Tikva (IL)

(73) Assignee: Corrigent Systems Ltd., Tel Aviv (IL)

( * ) Notice: Subject to any disclaimer, the term of this patent is extended or adjusted under 35 U.S.C. 154(b) by 756 days.

(21) Appl. No.: 09/756,946

(22) Filed: Jan. 9, 2001

(65) Prior Publication Data
US 2002/0118700 A1 Aug. 29, 2002

(51) Int. Cl.
*H04L 12/43* (2006.01)
(52) U.S. Cl. ............ 370/460; 370/395.21; 370/395.41; 370/406; 709/225; 709/226; 709/232; 709/238
(58) Field of Classification Search ................. 370/389, 370/395.21, 395.41, 395.42, 406, 439, 460
See application file for complete search history.

(56) References Cited
U.S. PATENT DOCUMENTS

| | | | |
|---|---|---|---|
| 5,461,611 A * | 10/1995 | Drake et al. | ................. 370/420 |
| 5,581,703 A * | 12/1996 | Baugher et al. | ............ 709/225 |
| 5,706,516 A * | 1/1998 | Chang et al. | ............... 719/314 |
| 6,021,263 A | 2/2000 | Kujoory et al. | |
| 6,256,292 B1 | 7/2001 | Ellis et al. | |
| 6,262,976 B1 * | 7/2001 | McNamara | .................. 370/254 |
| 6,314,110 B1 * | 11/2001 | Chin et al. | ................... 370/468 |
| 6,339,488 B1 * | 1/2002 | Beshai et al. | .................. 398/59 |
| 6,400,681 B1 | 6/2002 | Bertin et al. | |
| 6,442,134 B1 | 8/2002 | Mitchell | |
| 6,456,407 B1 | 9/2002 | Tammela et al. | |
| 6,584,535 B1 | 6/2003 | Ouellet et al. | |
| 6,639,893 B1 * | 10/2003 | Chikenji et al. | ............ 370/217 |
| 6,639,896 B1 * | 10/2003 | Goode et al. | ................ 370/224 |
| 6,647,008 B1 | 11/2003 | Galand et al. | |
| 6,680,912 B1 | 1/2004 | Kalman et al. | |
| 6,711,125 B1 | 3/2004 | Walrand et al. | |
| 6,731,597 B1 | 5/2004 | Batchellor et al. | |
| 6,795,394 B1 | 9/2004 | Swinkels et al. | |
| 6,820,210 B1 | 11/2004 | Daruwalla et al. | |

OTHER PUBLICATIONS

Braden, R. et al., RFC 2205, Resource ReSerVation Protocol (RSVP), Sep. 1997, pp. 1-112.
Moy, J., RFC 2328, "OSPF Version 2", Apr. 1998, pp. 1-243.
Telede, D. et al., RFC 2814, "A Protocol for RSVP-Based Admission Control Over IEEE 802-Style Networks", May 2000, pp. 1-56.
Cisco, D.G., RFC 2892, "The Cisco SRP MAC Layer Protocol", Aug. 2000, pp. 1-52.

* cited by examiner

*Primary Examiner*—Brian Nguyen
*Assistant Examiner*—Tri H. Phan
(74) *Attorney, Agent, or Firm*—Darby & Darby

(57) ABSTRACT

In a communication network that includes a plurality of nodes interconnected by links, a method for routing a data flow includes receiving a request to allocate one or more resources in the network so as to carry the data flow between first and second ones of the nodes over one of a plurality of paths therebetween, each such path including a respective sequence of the links. For the links included in each of the paths, respective levels of use of the requested resources due to communications in process over the network are determined. The path that is to carry the data flow is selected responsive to the determined levels of use of the requested resources on the links included in each of the paths.

18 Claims, 6 Drawing Sheets

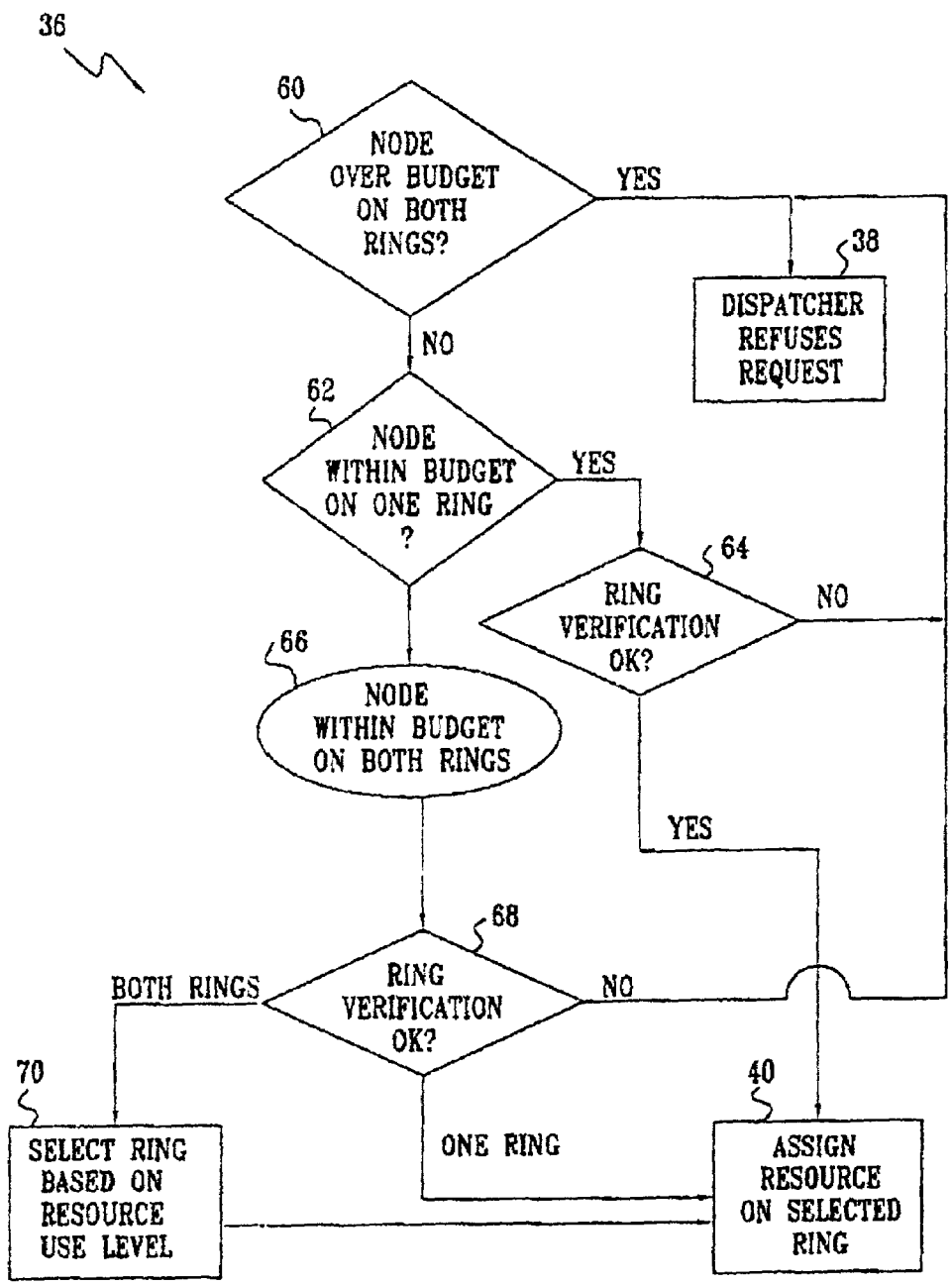

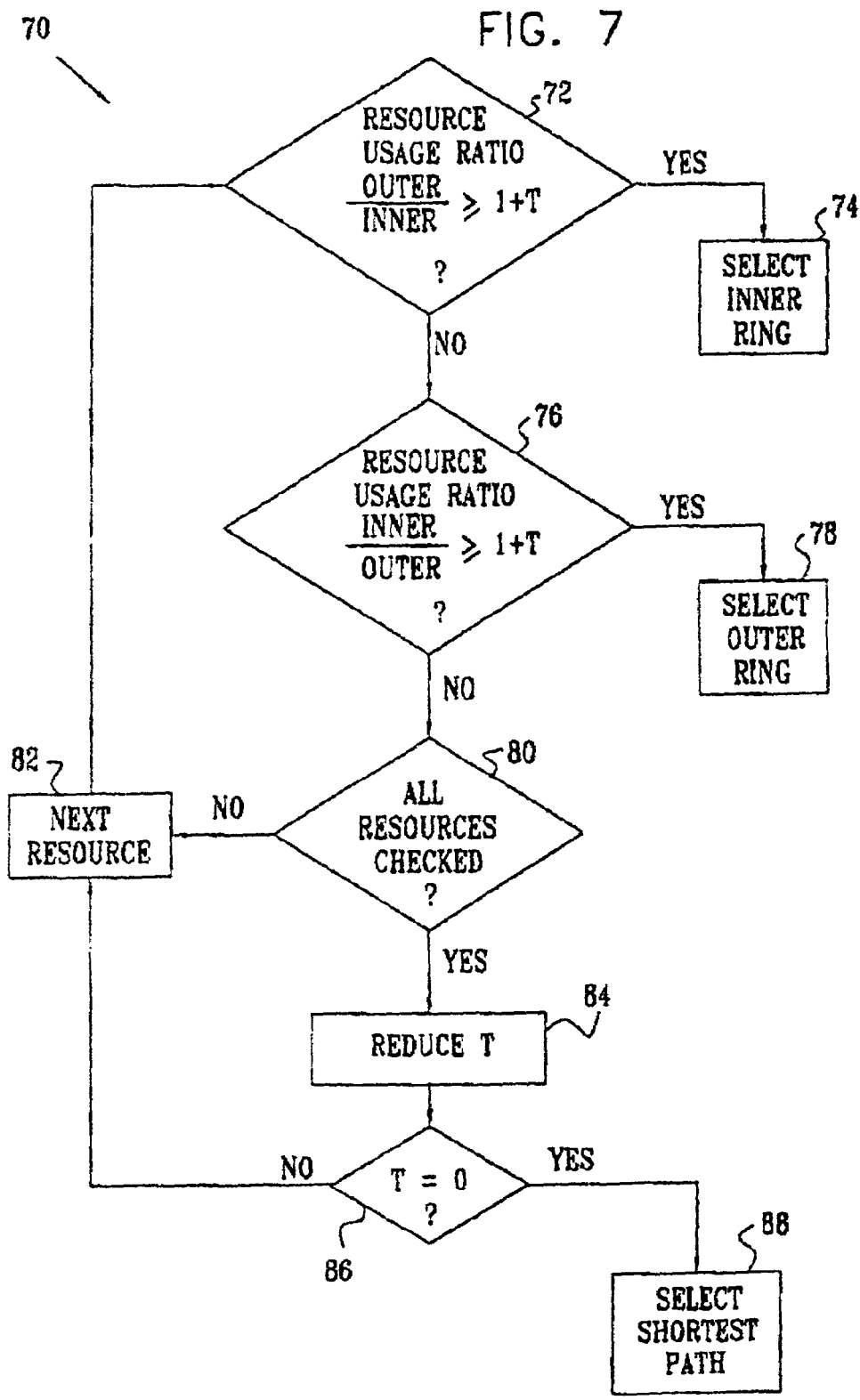

FLOW ALLOCATION IN A RING TOPOLOGY

FIELD OF THE INVENTION

The present invention relates generally to communication networks, and specifically to methods and systems for efficient allocation of resources for data flow in such networks.

BACKGROUND OF THE INVENTION

Network ring topologies are gaining in popularity, particularly in Internet Protocol (IP) networks. Such networks enable carriers to offer large bandwidth to users in a cost-effective manner. In order to gain these benefits, however, IP needs appropriate support at the Media Access Control (MAC—protocol layer 2) level, to provide functions such as load balancing, protection and clock synchronization.

One solution that has been proposed to meet these needs is the Spatial Reuse Protocol (SRP), which is described by Tsiang et al., in Request for Comments (RFC) 2892 of the Internet Engineering Task Force (IETF). This document, which is available at www.ietf.org/rfc.html, is incorporated herein by reference. SRP relates to the ring network as two overlapping local area networks (LANs), identified arbitrarily as an inner ring and an outer ring. In one of the rings, communication flows clockwise, while in the other it flows counterclockwise. Each node in the ring can communicate directly with all other nodes through either of the rings, using the appropriate MAC addresses of the nodes. Spatial reuse enables different nodes to use different, non-overlapping spans of the same ring simultaneously (unlike earlier ring protocols), thus increasing the overall aggregate bandwidth that is available.

Although SRP allows nodes to choose whether to route their packets on the inner or the outer ring, it does not provide any method for nodes to use in deciding which ring to choose. SRP recognizes different packet priority levels, and it also provides a mechanism for congestion control and fair load control on each of the two rings individually at the lower priority level. It thus supplies an infrastructure that can be used by applications to offer different Quality of Service (QoS) options. The SRP RFC, however, does not deal with how IP flows should be assigned to high priority levels or how load control should be accomplished for such high-priority packets.

There are routing protocols known in the art for choosing an optimal path between two nodes when multiple paths are available. These protocols have generally been designed with mesh networks in mind, although they can also be applied to bi-directional ring networks. For example, the Open Shortest First Protocol (OSFP) is a link-state routing protocol that is used to identify and select the path that has the lowest overall "cost." OSFP is described by Moy in RFC 2328 of the IETF, which is available at the above-mentioned Web address and is likewise incorporated herein by reference. This protocol enables a system administrator to assign a cost to each link in the network, so that low-cost links are the ones most likely to be selected for routing. OSFP does not specify, however, how the costs are to be determined. Moreover, since the costs are assigned statically by the system administrator, the protocol does not provide any means or basis for updating the costs automatically, while the network is running, in response to network resource constraints.

SUMMARY OF THE INVENTION

It is an object of the present invention to provide improved methods and apparatus for routing data flows in a network.

It is a particular object of some aspects of the present invention to provide a method for controlling flow allocation in a network that is arranged in a ring topology.

It is a further object of some aspects of the present invention to provide a method of data flow allocation that makes optimal use of resources that are available on different network links. The term "resources" in this context, and throughout the specification and claims of the present patent application, refers not only to bandwidth, but also to processing power used to transmit, receive, encrypt or decrypt data, as well as to any other allowable factor that may affect the ability of a network link to convey a data flow between nodes.

In preferred embodiments of the present invention, a communication network comprises a plurality of nodes, which are preferably arranged in a ring topology. The nodes are capable of transmitting data around the ring in either a clockwise or a counterclockwise direction, or in other words, following SRP convention, over an inner or an outer ring within the network. A dispatcher, preferably in the form of a process running on one of the nodes, learns the topology of the network and tracks the use of network resources by each of the nodes while the network is running. Whenever a node needs to use network resources to carry a data flow to another node, it first determines whether it already has sufficient resources allocated to it in order to convey the data flow. If the node does not have sufficient resources, it requests an allocation from the dispatcher. Based on the levels of resource use on the links of the inner and outer rings, the dispatcher processes the request and determines whether to allocate the resources and, if so, on which of the rings.

Preferred embodiments of the present invention thus provide the means to select one of a plurality of possible paths through a network between a pair of nodes based on a dynamic assessment of network resource availability that is made by the dispatcher, rather than static link "costs" or other factors used in protocols known in the art. This dynamic capability is of particular applicability and usefulness in ring networks, but it can also be applied to substantially any other multi-path network topology.

There is therefore provided, in accordance with a preferred embodiment of the present invention, in a communication network that includes a plurality of nodes interconnected by links, a method for routing a data flow, including:

receiving a request to allocate one or more resources in the network so as to carry the data flow between first and second ones of the nodes over one of a plurality of paths therebetween, each such path including a respective sequence of the links;

determining, for the links included by each of the paths, respective levels of use of the requested resources due to communications in process over the network; and selecting which of the paths is to carry the data flow responsive to the determined levels of use of the requested resources on the links included in each of the paths.

Preferably, the network includes an Internet Protocol (IP) network, and the nodes are interconnected in a ring, wherein the plurality of paths includes a first path traversing the ring in one direction and a second path traversing the ring in the opposite direction, and wherein selecting which of the paths is to carry the data flow includes selecting the first or the second path. Most preferably, selecting the first or the second path includes conveying the data flow over an inner or outer data link ring within the network provided by a Spatial Reuse Protocol (SRP).

Preferably, the one or more resources include a link bandwidth and, additionally or alternatively, a processing power associated with each of the links.

Preferably, selecting which of the paths is to carry the data flow includes comparing an amount of the one or more resources requested to a resource budget assigned to the first node, and permitting the data flow only if allocating the requested resources will not cause a total of the resources allocated to the first node to exceed the budget. Most preferably, comparing the amount of the one or more resources includes comparing the amount of each of the resources requested to the resource budget assigned for each of the resources, and permitting the data flow includes permitting the flow only if all of the resources requested for at least one of the paths are within the budget.

Additionally or alternatively, selecting which of the paths is to carry the data flow includes increasing an allocation to the first node of the one or more requested resources on the selected path by a predetermined quantum. Further additionally or alternatively, selecting which of the paths is to carry the data includes verifying that a sufficient amount of the requested resources is available to carry the data flow on every one of the links included in the selected path.

Preferably, selecting which of the paths is to carry the data flow includes selecting the one of the paths having the lowest level of a predetermined measure of use of the requested resources. Most preferably, selecting the one of the paths includes finding, for each of at least two of the paths, a maximum level of use of at least one of the requested resources, taken over all of the links included in the paths, and selecting the one of the paths having the lowest maximum level of use.

In a preferred embodiment, receiving the request includes choosing a dispatcher within the network to manage allocation of the resources, wherein the dispatcher receives and processes the request. Preferably, choosing the dispatcher includes choosing one of the nodes to act as the dispatcher. Most preferably, the dispatcher is operative as a software process running on the associated node.

There is also provided, in accordance with a preferred embodiment of the present invention, a communication network, including:

a plurality of nodes;

a plurality of links, interconnecting the nodes to provide communications therebetween; and a dispatcher, coupled to receive a request to allocate one or more resources in the network so as to carry the data flow between first and second ones of the nodes over one of a plurality of paths therebetween, each such path including a respective sequence of the links, and adapted to determine, for the links included in each of the paths, respective levels of use of the requested resources due to communications in process over the network and to select which of the paths is to carry the data flow responsive to the determined levels of use of the requested resources on the links included in each of the paths.

The present invention will be more fully understood from the following detailed description of the preferred embodiments thereof, taken together with the drawings in which:

BRIEF DESCRIPTION OF THE DRAWINGS

FIG. 6 is a flow chart that schematically illustrates a method by which a dispatcher selects a network ring on which to allocate resources to a node, in accordance with a preferred embodiment of the present invention; and FIG. 7 is a flow chart showing a detail of the method of FIG. 6, in accordance with a preferred embodiment of the present invention.

DETAILED DESCRIPTION OF PREFERRED EMBODIMENTS

Figure 1:
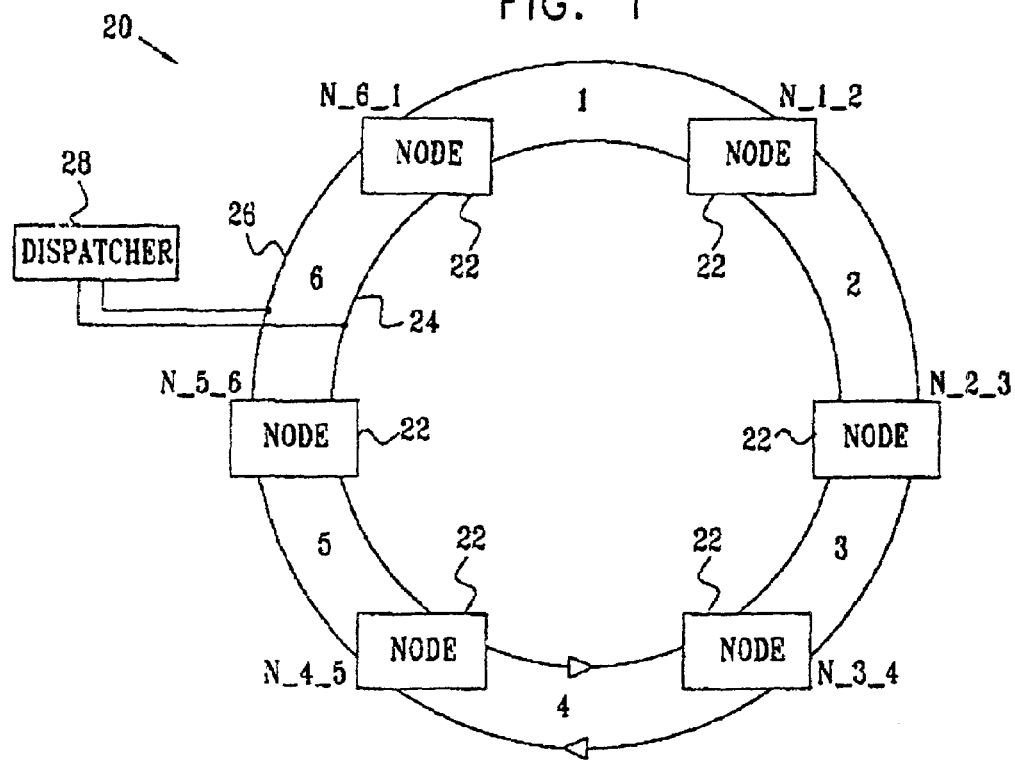
FIG. 1 is a block diagram that schematically illustrates a ring network with a dispatcher for controlling data flow, in accordance with a preferred embodiment of the present invention.
Figure 2:
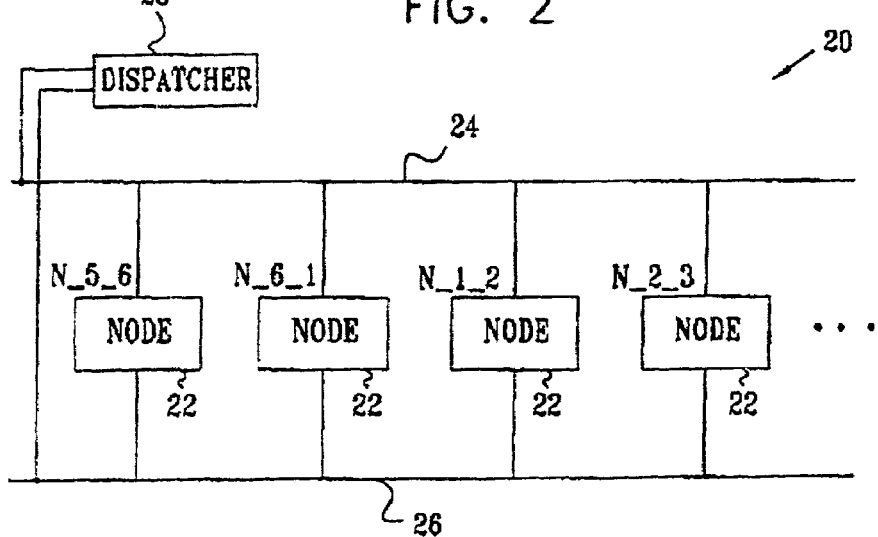
FIG. 2 is a block diagram that schematically illustrates a logical layout of the network of FIG. 1.

Reference is now made to FIGS. 1 and 2, which are block diagrams that schematically illustrate an IP ring network 20, in accordance with a preferred embodiment of the present invention. FIG. 1 shows the physical layout of the network, while FIG. 2 shows the logical layout. Network 20 comprises nodes 22, which are connected by links numbered 1 through 6. Each node is identified by the two links that are connected to it, i.e., N_1_2 between links 1 and 2, and so forth up to N_6_1. Each node can communicate with every other node over either a counterclockwise or a clockwise path around the ring. Following SRP convention, these two paths are identified as an inner ring 24 and an outer ring 26, each of which is made up of segments corresponding to the physical links between the nodes.

A dispatcher 28 tracks the use of resources in network 20 and allocates resources to nodes 22 as required. The dispatcher is shown, for the sake of clarity, as an entity that is separate from the network nodes. Alternatively, the dispatcher may be associated with one of the nodes, typically as a software process running on the node. As noted above, the resources with which the dispatcher is concerned typically include bandwidth, as well as processing and encryption power and other capabilities that may be needed by applications that generate data flows from node to node. The resources are preferably classified by priority. In order to make a decision on whether to allocate resources on the inner ring or on the outer ring, as described hereinbelow, the dispatcher first considers the relative availability of the highest-priority resource, and refers to the lower-priority resources only when the higher-priority resources did not lead to an unequivocal decision.

For each resource of concern, dispatcher 28 maintains a record of the maximum available quantity of the resource in each segment of rings 24 and 26. This quantity is referred to hereinafter as "segment_maximum", and is denoted mRi.n for the inner loop and mRo.n for the outer loop, wherein n is the segment number (from 1 to 6, in the example of FIG. 1). The dispatcher also maintains a segment utilization table, indicating the current resource utilization for each resource on each of the segments: Ri.n and Ro.n for the inner and outer rings, respectively. Some segments may not have one or more of the resources in question, in which case they will be so marked in the table and will not be considered by the dispatcher in dispatching data flows that require such a resource. The dispatcher updates the values of Ri.n or of Ro.n in the segment utilization table whenever it allocates or deallocates resources for a data flow between two nodes. The update applies to all of the segments along the route between the nodes.

In addition to maintaining segment availability information, the dispatcher is configured with the following parameters for each of the nodes with respect to each of the resources:

node_budget_In—Maximum amount of the resource that the node can receive on the inner ring.
node_budget_Out—Maximum amount of the resource that the node can receive on the outer ring.
node_used_In—Amount of the resource currently allocated to the node on the inner ring.
node_used_Out—Amount of the resource currently allocated to the node on the outer ring.
node_quantum—Amount by which to increase or decrease node_used_In or Out at each resource allocation or deallocation. Resources are allocated in quanta in order to limit the frequency with which allocation and deallocation operations must be performed.

Other parameters used by the dispatcher in its allocation decisions are noted below.

Similarly, each node 22 maintains its own record of the following parameters for each resource with respect to each possible destination node:

allowed_In—Maximum amount of the resource that is currently available for use by the node on the inner ring for data flow to the specific destination node.
allowed$_{13}$ Out—Maximum amount of the resource that is currently available for use by the node on the outer ring for data flow to the specific destination node.
used$_{13}$ In—Amount of the resource currently in use on the inner ring by clients of the node for data flow to the specific destination node.
used_Out—Amount of the resource currently in use on the outer ring by clients of the node for data flow to the specific destination node.
node_quantum—As noted above with reference to the dispatcher.

These parameters are used in making flow allocation decisions, as described with reference to the figures that follow. Communications between nodes 22 and dispatcher 28 in this regard preferably use a standard protocol, such as the Resource Reservation Protocol (RSVP), described by Braden et al., in IETF RFC 2205, which is available at the above-mentioned Web address and is incorporated herein by reference.

Figure 3:
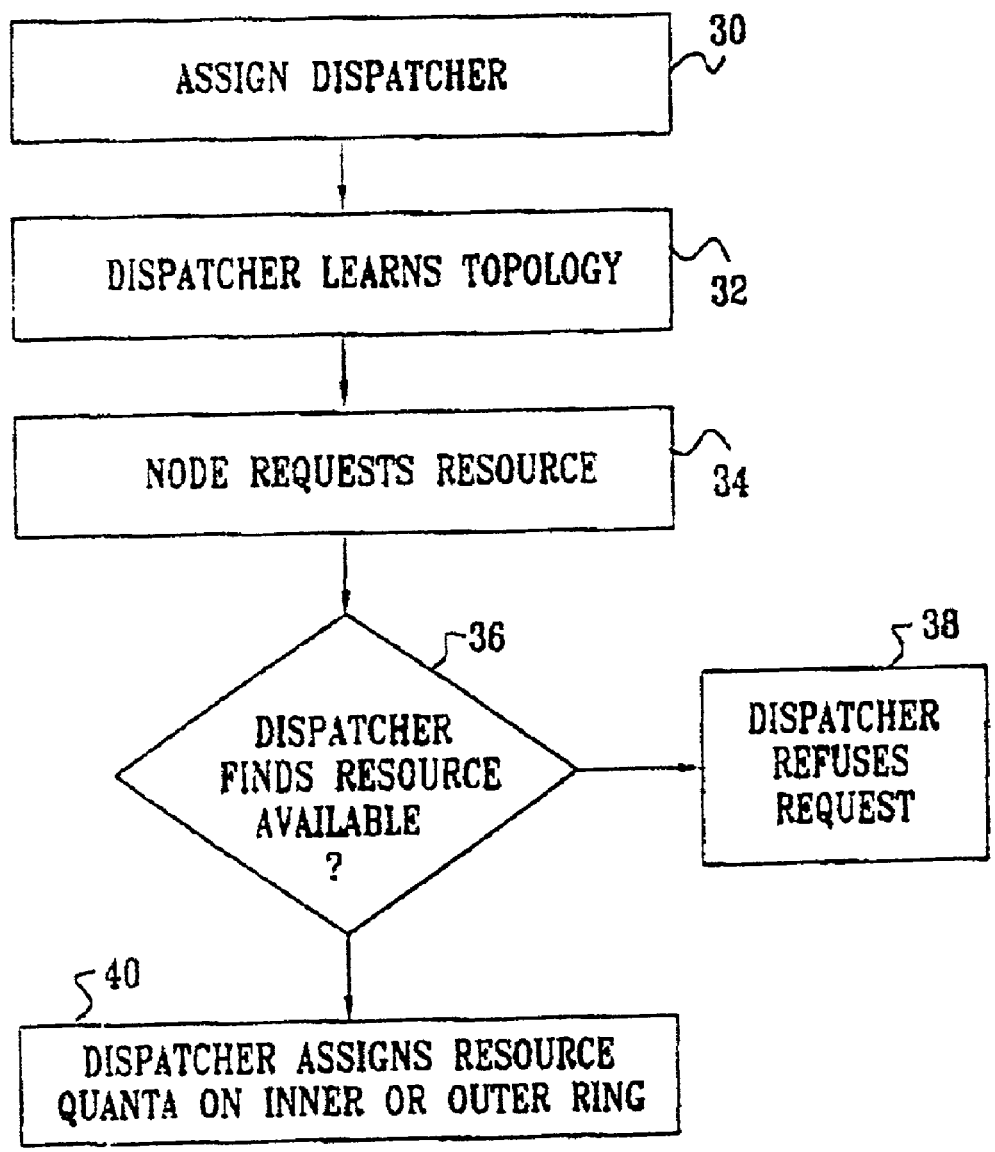
FIG. 3 is a flow chart that schematically illustrates a method for assigning network resources to network nodes, in accordance with a preferred embodiment of the present invention.

FIG. 3 is a flow chart that schematically illustrates a method for assigning resources to nodes 22, in accordance with a preferred embodiment of the present invention. In preparation for this method, a dispatcher entity is chosen or assigned within network 20, at an assignment step 30. Assuming that dispatcher 28 runs on one of nodes 22, as mentioned above, the dispatcher is preferably chosen by the nodes from among themselves using a suitable network management protocol. An example of such a protocol is the Subnet Bandwidth Manager (SBM) protocol, described by Yavatkar et al., in IETF RFC 2814, which is available at the above-mentioned Web address and is incorporated herein by reference. This protocol also enables the nodes to choose a substitute dispatcher if the original dispatcher is lost due to a node or network failure. At a learning step 32, dispatcher 28 learns the topology of rings 24 and 26 using methods known in the art, as specified by SRP (RFC 2892), for example, and builds the tables of network information to be used subsequently in flow allocations.

When a node receives a request from one of its clients to send data to another node, the node first checks to determine whether it has sufficient resources already allocated to it in order to service the request. If the allocated resources are inadequate, the node submits a resource request to the dispatcher, indicating the destination node, at a request step 34. The dispatcher then checks whether there are resources available to the node on either the inner or the outer ring, at an availability checking step 36. There must both be sufficient unallocated resources left in the specific node budget and unused resources left on the appropriate segments of at least one of the rings in order for the dispatcher to grant the node's resource request. If not, the dispatcher refuses the request, at a refusal step 38, and the node returns an appropriate error report to the client application. Preferably, the dispatcher returns an error message to the node indicating the resource or resources that were lacking and thus led to the refusal.

If resources are available, however, the dispatcher determines on which of the rings to allocate the resources, at an assignment step 40. The dispatcher allocates one or more additional quanta to the node on the selected ring for use in communicating with the requested destination node, and the node is then able to carry out the data transmission. The dispatcher also updates its resource utilization tables, incrementing the value of Ri.n or Ro.n for each of the segments along the data flow route by the number of additional resource quanta that it has allocated.

Figure 4:
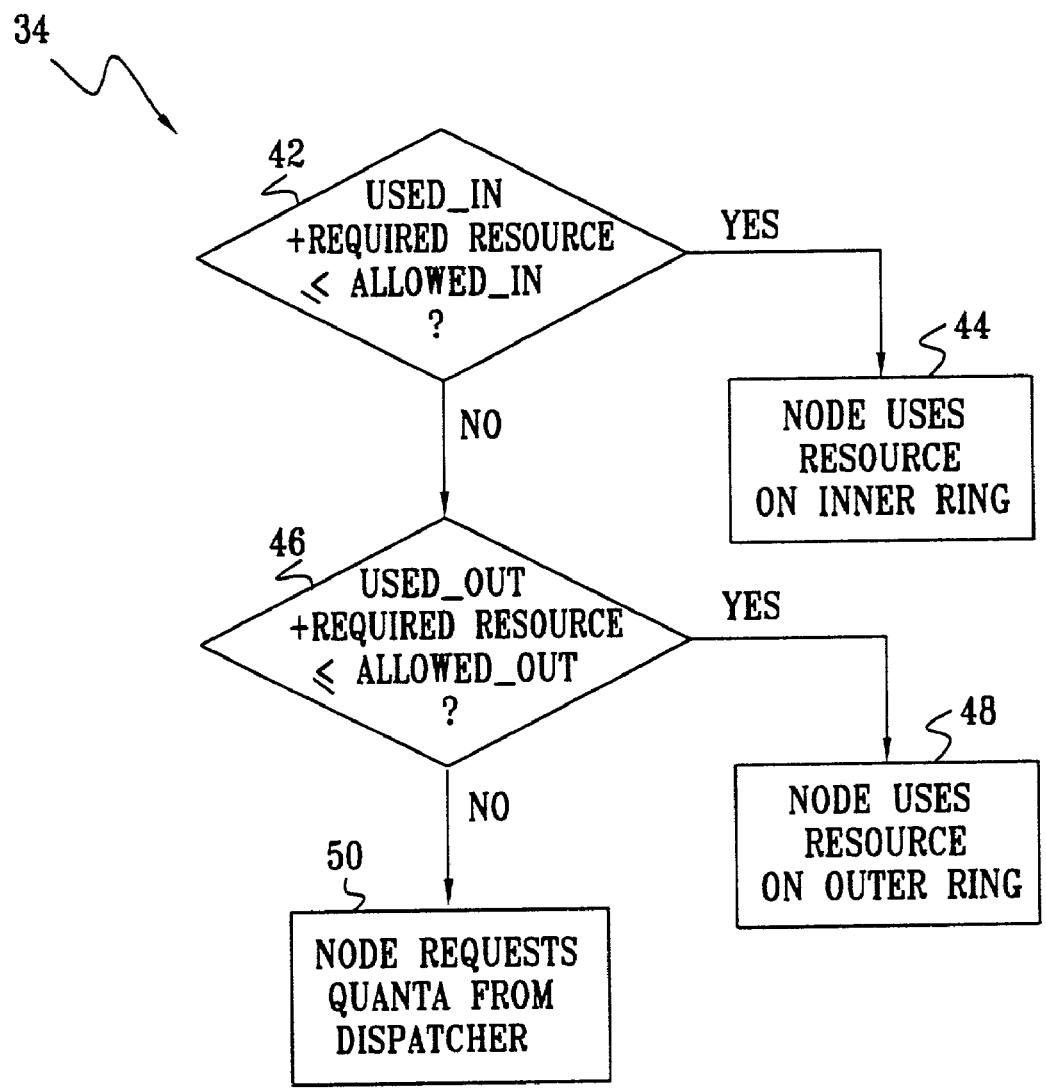
FIG. 4 is a flow chart that schematically illustrates a method by which a node generates a resource allocation request, in accordance with a preferred embodiment of the present invention.

FIG. 4 is a flow chart that schematically shows details of request step 34, in accordance with a preferred embodiment of the present invention. As noted above, after receiving a resource request from one of its clients, the node first checks to determine whether it has sufficient resources already allocated to deal with the request. At an inner ring checking step 42, the node tests whether its current used_In for each resource to the desired destination, added to the required amount of new resource required, is less than or equal to its current allowed_In for the destination. If so, the node carries out the requested transmission on the inner ring, at an inner ring transmission step 44, without having to communicate with the dispatcher. If the node does not have sufficient resources to handle the request on the inner ring, it performs a similar check with respect to used_Out and allowed_Out, at an outer ring checking step 46. Then, if there are sufficient resources on the outer ring, the node carries out the transmission on the outer ring, at an outer ring transmission step 48. Otherwise, the node requests one or more quanta of the resource, as needed, from the dispatcher, at a quantum request step 50. The process then continues at step 36 (FIG. 3).

Figure 5:
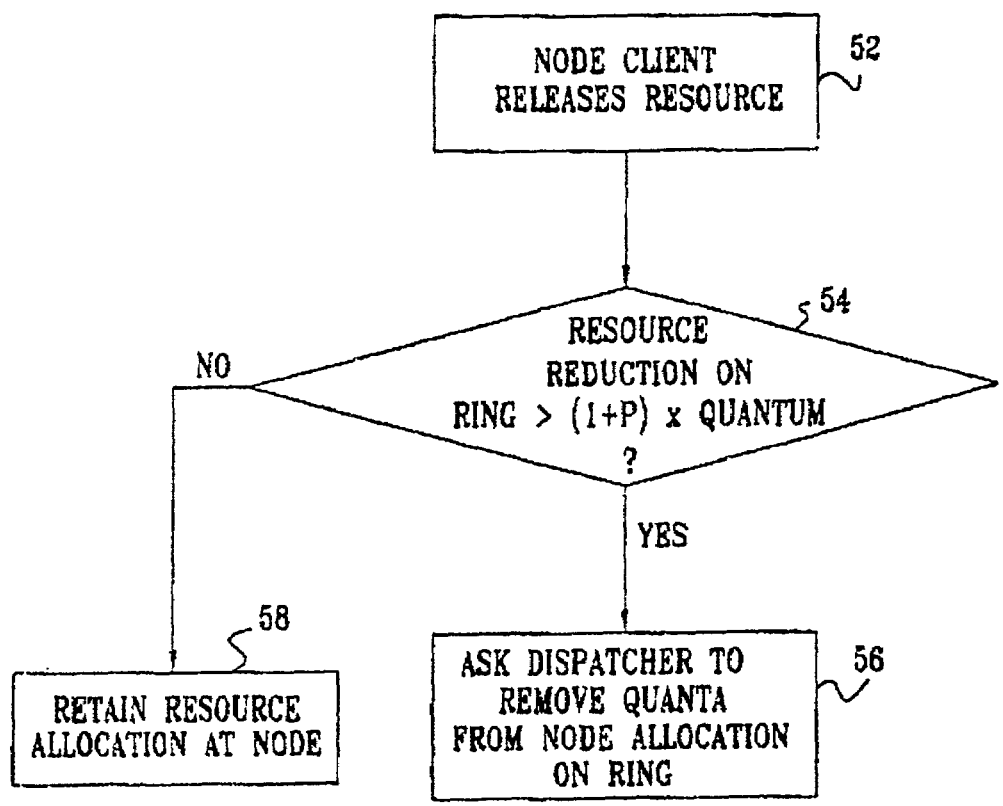
FIG. 5 is a flow chart that schematically illustrates a method by which a node releases a network resource allocation, in accordance with a preferred embodiment of the present invention.

FIG. 5 is a flow chart that schematically illustrates a method by which nodes release resources that they no longer need, in accordance with a preferred embodiment of the present invention. The method is invoked when one of the node's clients releases resources that it had earlier requested, at a release step 52. Preferably, a hysteresis factor, p, is used in determining whether to deallocate one or more quanta of the resource (i.e., to return the quanta to the dispatcher). Most preferably, p is set to a value between zero and one.

At a hysteresis step 54, the node determines whether the amount of the resource released by the client is sufficient to justify returning one or more quanta of the resource to the dispatcher. Formally (assuming for the moment that the resource was released on the inner ring), if the node finds that (used_In—resource amount released) is less than or equal to (allowed_In—[1+p]×node_quantum), then a deallocation step 56 is invoked. In this case, the node asks the dispatcher to remove one quantum from its allocation, while also indicating the destination node for which the removed quantum was previously used, leaving the node with sufficient resources to serve its remaining active data flows. The node reduces its values of both used_In and allowed_In accordingly for the relevant destination node, and the dispatcher similarly reduces node_used_In. The dispatcher also decrements Ri.n for each of the segments along the data flow path. Outer ring resources are treated in like manner.

Otherwise, if amount of the released resource does not justify returning a quantum to the dispatcher, the node does not communicate with the dispatcher. Rather, the node keeps the resource for subsequent use, at a resource retainment step 58. In this case, used_In is reduced, but not allowed_In.

FIG. 6 is a flow chart that schematically shows details of availability checking step 36, in accordance with a preferred embodiment of the present invention. Dispatcher 28 uses the method of FIG. 6 to determine on which ring (if at all) to allocate resources in response to a node resource request. At a budget checking step 60, in response to a request by a node to allocate a quantum of resources, the dispatcher checks whether allocation of the additional quantum will put the node over budget on either or both of rings 24 and 26. In other words, the dispatcher checks for the inner ring whether node_used_In+node_quantum>node_budget_In, and likewise for the outer ring. If the quantum will put both rings over budget, the dispatcher refuses the node request at step 38. The test of step 60 is performed for each one of the resources that will be required in order to grant the node request. The dispatcher will not grant the request unless at least one of the rings has a sufficient budget for all of the resources required.

The dispatcher may alternatively find that the node does have sufficient resources in its budget on one of the rings in order to provide the requested resource, but not on the other ring, at a single ring budget step 62. In this case, the dispatcher proceeds to verify that there are sufficient resources available to fill the request on all of the relevant segments of the ring, at a verification step 64. For each of the segments on the chosen ring (say the inner ring) between the requesting node and its destination node, and for each of the resources concerned, the dispatcher checks whether Ri.n+node_quantum≤mRi.n. If this condition is satisfied for all of the resources and all of the segments, the dispatcher assigns the requested resources at step 40. Otherwise, the dispatcher refuses the request at step 38.

It may also occur that the node has sufficient resources in its budget to satisfy the request on both of the rings, at a dual ring budget step 66. In this case, the dispatcher verifies that there are sufficient resources available on all of the relevant segments of both of the rings, at a dual verification step 68. The verification is performed in substantially the same manner as at step 64, described above. If neither of the rings has sufficient resources available on all of its relevant segments, the dispatcher refuses the resource request at step 38. If only one of the rings has sufficient resources available on all of its relevant segments, the dispatcher assigns the requested resources on that ring at step 40. If both rings have sufficient resources available on all of the relevant segments, then the dispatcher proceeds to choose the ring that has, generally speaking, the lower level of current resource allocation, at a ring selection step 70, and to assign the requested resources on this ring at step 40.

FIG. 7 is a flow chart that schematically shows details of ring selection step 70, in accordance with a preferred embodiment of the present invention. The method here is based on comparing relative resource usage levels for all of the relevant segments on both of the rings. The relative resource usage level is defined as Ri.n/mRi.n for the inner ring, and Ro.n/mRo.n for the outer ring. A usage ratio, for comparing the relative usage levels of the segments between the source and destination nodes on the outer ring path to those on the inner ring path, is defined as follows:

$$\text{Usage\_ratio}\left(\frac{\text{outer}}{\text{inner}}\right) = \frac{\text{Max}(Ro.n/mRo.n)}{\text{Max}(Ri.n/mRi.n)}$$

Here the maximum of the usage levels is taken over all of the participating segments in each of the paths. The ratio is calculated for each of the resources that is of concern in filling the node request.

In carrying out step 70, the dispatcher makes use of two additional arbitrary parameters: resource_threshold and reduce_quantum. These parameters are used by the dispatcher to maintain a certain hysteresis in toggling back and forth between allocating resources on the inner and outer rings, as described below.

At a first ratio testing step 72, the dispatcher tests the (outer/inner) usage ratio for the resource that has highest priority, and determines whether it is greater than or equal to 1+T, wherein T is initially set equal to the resource_threshold. If so, the dispatcher concludes that there is substantially heavier resource usage on the outer ring than on the inner ring. Consequently, the dispatcher selects the inner ring for allocation of the requested resources, at an inner ring selection step 74.

Alternatively, at a second ratio testing step 76, the dispatcher tests the (inner/outer) usage ratio (the inverse of the ratio shown in the equation above) for the highest-priority resource. In this case, if the ratio is greater than or equal to 1+T, the dispatcher selects the outer ring, at an outer ring selection step 78.

If neither of the usage ratios is greater than or equal to 1+T for the highest-priority resource, the dispatcher checks to determine whether there are other resources to be taken into account, at a resource checking step 80. If so, the usage ratios for the next resource, in order of priority, are calculated, at a next resource step 82, and steps 72 and 76 are repeated.

If the usage ratios for all of the relevant resources are checked for a given value of T with no conclusive result, T is reduced by an amount equal to reduce_quantum, at a reduction step 84. Steps 72 and 76 are then repeated again using the reduced value of T for all of the resources in order of priority, as described above. This process continues until T is reduced to zero, at a termination step 86. At this point, the dispatcher has found the relative resource usage levels to be substantially the same for the inner and outer rings. It thus cannot use the usage levels as a selection criterion. Instead, the dispatcher preferably chooses the shortest path, with the smallest number of nodes to traverse, between the source and destination nodes, at a shortest path step 88. If the paths on the inner and outer rings are of the same length, the dispatcher uses a preprogrammed rule to choose one of the rings, such as always choosing the inner or the outer ring, or a random toggle.

Although preferred embodiments are described hereinabove with reference to a ring topology and to certain specific protocols, such as SRP and IP, used in conjunction with this topology, the principles of the present invention are similarly applicable to networks of other topologies, such as mesh topologies, and other protocols. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. In a communication network that includes a plurality of nodes interconnected by links, the nodes including at least first and second nodes, a method for routing a data flow, comprising:
   allocating a respective number of quanta of one or more resources in the network to each of the nodes;
   receiving a request at the first node to use a portion of the resources so as to carry the data flow between the first and second nodes over one of a plurality of paths therebetween, each such path comprising a respective sequence of the links; and
   in response to the request:
      if the resources already allocated to the first node on one of the paths are sufficient, directing the data flow from the first node to the second node over the one of the paths without requesting additional resources; and
      if the resources already allocated to the first node are insufficient, performing the following steps:
         requesting an increase in an allocation to the first node of the requested resources;
         determining, for the links comprised by each of the paths, respective levels of use of the requested resources due to communications in progress over the network;
         selecting which of the paths is to carry the data flow responsive to the determined levels of use of the requested resources on the links comprised in each of the paths; and
         increasing the allocation of the resources to the first node on the selected path by a predetermined quantum.

2. A method according to claim 1, wherein the network comprises an Internet Protocol (IP) network.

3. A method according to claim 1, wherein the nodes are interconnected in a ring, and wherein the plurality of paths comprises a first path traversing the ring in one direction and a second path traversing the ring in the opposite direction, and wherein selecting which of the paths is to carry the data flow comprises selecting the first or the second path.

4. A method according to claim 3, wherein selecting the first or the second path comprises conveying the data flow over an inner or outer data link ring within the network provided by a Spatial Reuse Protocol (SRP).

5. A method according to claim 1, wherein the one or more resources comprise a link bandwidth.

6. A method according to claim 1, wherein the one or more resources comprise a processing power associated with each of the links.

7. A method according to claim 1, wherein selecting which of the paths is to carry the data flow comprises comparing an amount of the one or more resources requested to a resource budget assigned to the first node, and permitting the data flow only if allocating the requested resources will not cause a total of the resources allocated to the first node to exceed the budget.

8. A method according to claim 7, wherein comparing the amount of the one or more resources comprises comparing the amount of each of the resources requested to the resource budget assigned for each of the resources, and wherein permitting the data flow comprises permitting the flow only if all of the resources requested for at least one of the paths are within the budget.

9. A method according to claim 1, wherein selecting which of the paths is to carry the data comprises verifying that a sufficient amount of the requested resources is available to carry the data flow on every one of the links comprised in the selected path.

10. A method according to claim 1, wherein selecting which of the paths is to carry the data flow comprises selecting the one of the paths having the lowest level of a predetermined measure of use of the requested resources.

11. A method according to claim 1, wherein receiving the request comprises choosing a dispatcher within the network to manage allocation of the resources, wherein the dispatcher receives and processes the request.

12. A method according to claim 11, wherein choosing the dispatcher comprises choosing one of the nodes to act as the dispatcher.

13. A method according to claim 11, wherein requesting the increase in the allocation comprises requesting and receiving the allocation from the dispatcher.

14. A method according to claim 1, and comprising, upon release of the requested resources:
   comparing an amount of the resources that have been released to a predetermined threshold; and
   if the amount is greater than the predetermined threshold, deallocating the predetermined quantum from the first node.

15. A communication network, comprising:
   a plurality of nodes, comprising at least first and second nodes;
   a plurality of links, interconnecting the nodes to provide communications therebetween; and
   a dispatcher, which is adapted to allocate a respective number of quanta of one or more resources in the network to each of the nodes,
   wherein the first node is adapted, upon receiving a request to use a portion of the resources so as to carry the data flow between the first and second nodes over one of a plurality of paths therebetween, each such path comprising a respective sequence of the links, to direct the data flow from the first node to the second node over one of the paths without requesting additional resources if the resources already allocated to the first node on the one of the paths are sufficient, and to request an increase in an allocation of the requested resources to the first node if the resources already allocated to the first node are insufficient, and
   wherein in response to the increase requested by the first node, the dispatcher is adapted to determine, for the links comprised in each of the paths, respective levels of use of the requested resources due to communications in progress over the network and to select which of the paths is to carry the data flow responsive to the determined levels of use of the requested resources on the links comprised in each of the paths, and to increase the allocation of the resources to the first node on the selected path by a predetermined quantum.

16. A network according to claim 15, wherein the dispatcher is adapted to select for carrying the data flow the one of the paths that has the lowest level of a predetermined measure of use of the requested resources.

17. A network according to claim 16, wherein the measure of use comprises, for each of at least two of the paths, a maximum level of use of at least one of the requested resources, taken over all of the links comprised in the paths.

18. A network according to claim 15, wherein the first node is adapted, upon release of the requested resources, to compare an amount of the resources that have been released to a predetermined threshold, and if the amount is greater than the predetermined threshold, to deallocate the predetermined quantum from the first node.

* * * * *